(12) United States Patent
Majer

(10) Patent No.: US 8,448,903 B2
(45) Date of Patent: May 28, 2013

(54) LONGITUDE-DRIFT PHASE PLANE CONTROL WITH CONTINUOUS OR QUASI-CONTINUOUS MANEUVERS

(75) Inventor: Vaclav Majer, Annapolis, MD (US)

(73) Assignee: Kratos Integral Holdings, LLC, San Diego, CA (US)

( * ) Notice: Subject to any disclaimer, the term of this patent is extended or adjusted under 35 U.S.C. 154(b) by 335 days.

(21) Appl. No.: 12/931,005

(22) Filed: Jan. 21, 2011

(65) Prior Publication Data

US 2012/0187250 A1 Jul. 26, 2012

(51) Int. Cl.
*B64G 1/10* (2006.01)
(52) U.S. Cl.
USPC ..................................... 244/158.6; 244/171.1
(58) Field of Classification Search
USPC .......... 244/158.4, 158.6, 158.8, 171.1, 171.2; 701/13
See application file for complete search history.

(56) References Cited

U.S. PATENT DOCUMENTS

| | | | | |
|---|---|---|---|---|
| 4,767,084 A | * | 8/1988 | Chan et al. | 244/164 |
| 5,528,502 A | * | 6/1996 | Wertz | 701/13 |
| 5,810,295 A | * | 9/1998 | Anzel | 244/158.6 |
| 5,957,411 A | * | 9/1999 | Liu et al. | 244/169 |
| 6,042,058 A | * | 3/2000 | Anzel | 244/164 |
| 6,341,249 B1 | * | 1/2002 | Xing et al. | 701/13 |
| 6,435,457 B1 | * | 8/2002 | Anzel | 244/169 |
| 8,099,186 B2 | * | 1/2012 | Tekawy et al. | 700/226 |

* cited by examiner

*Primary Examiner* — Tien Dinh
*Assistant Examiner* — Keith L Dixon
(74) *Attorney, Agent, or Firm* — Procopio, Cory, Hargreaves & Savitch, LLC

(57) ABSTRACT

A satellite longitude and drift control method is provided that includes providing a satellite that has a continuously or a quasi-continuously firing thruster, where the thruster is disposed to apply accelerations which counter a tri-axiality displacement in an orbit of the satellite, and the satellite thruster is disposed to achieve optimal ΔV performance in the presence of orbit determination and orbit propagation errors. The method further includes targeting an optimal two-phase continuous acceleration target cycle using the continuously or the quasi-continuously firing thruster, providing a closed loop and a hybrid loop implementation of the thruster firing, where the hybrid loop implementation includes an open and closed loop implementation, and where the closed loop and the hybrid loop implementations are disposed to provide quasi-continuous implementations of an optimal continuous control program.

7 Claims, 14 Drawing Sheets

LONGITUDE-DRIFT PHASE PLANE CONTROL WITH CONTINUOUS OR QUASI-CONTINUOUS MANEUVERS

FIELD OF THE INVENTION

The current invention relates to satellite control. More particularly, the invention relates to design and implementation of longitude/drift control strategies targeting optimal two-phase continuous acceleration target cycles using continuously or quasi-continuously firing thrusters which may also produce significant radial thrust.

BACKGROUND OF THE INVENTION

Managing geosynchronous satellite longitudinal drift is an on-going problem. For the same $\Delta V$, ion thrusters must be fired for a much longer duration than chemical thrusters. That duration may include several shorter firings, however, due either to electric power limitations or the desire to limit long-arc $\Delta V$ losses, or both. Thus, there may be one or more small-$\Delta V$ ion thruster firings each day over several days in order to exert station keeping longitude/drift control.

What is needed is a way to provide longitude/drift control programs for tracking two-phase geosynchronous station keeping target cycles with low thrust, high specific impulse ion thrusters.

SUMMARY OF THE INVENTION

To address the needs in the art, a satellite longitude and drift control method is provided that includes providing a satellite, where the satellite has a continuously or a quasi-continuously firing thruster, where the thruster is disposed to apply accelerations which counter a tri-axiality displacement in an orbit of the satellite, and the satellite thruster is disposed to achieve optimal $\Delta V$ performance in the presence of orbit determination and orbit propagation errors. The method further includes targeting an optimal two-phase continuous acceleration target cycle using the continuously or the quasi-continuously firing thruster, providing a closed loop and a hybrid loop implementation of the thruster firing, where the hybrid loop implementation includes an open and closed loop implementation, and where the closed loop and the hybrid loop implementations are disposed to provide quasi-continuous implementations of an optimal continuous control program.

According to one aspect of the invention, the thruster includes a stationary plasma thruster (SPT), or a xenon ion propulsion system (XIP).

In another aspect of the invention, the thruster is disposed on the satellite to mitigate thruster plume impingement on north and south face solar arrays where the thruster is disposed on an anti-nadir face of the satellite, and where the thruster is canted to provide a nominal thrust that passed through a center of mass of the satellite.

In one aspect of the invention, the thruster is disposed to provide radial thrust.

In a further aspect of the invention, target cycles include at least one no-firing day for the thruster.

In yet another aspect of the invention, the targeted two-phase continuous acceleration cycle is discretized, where a continuous acceleration of the thruster is replaced with a change in an episodic impulsive mean longitudinal drift, a mean geodetic longitudinal drift is replaced with a change in a mean longitudinal departure, the continuous control program is disposed to provide an optimal the episodic impulsive mean longitudinal departure, and a mean longitudinal drift-continuous phase plane trajectory converges to a desired locus, whereby the locus is maintained. According to one aspect, the quasi-continuous control tracks a target trajectory using a piece-wise continuous sequence of the episodic mean longitudinal departures, where the mean geodetic longitudinal drift is acted on by the episodic mean longitudinal departure, the mean geodetic longitudinal drift is acted on by an episodic geodetic longitudinal drift, and a coast trajectory segment is centered about an optimal continuous trajectory.

DETAILED DESCRIPTION

Figure 1:
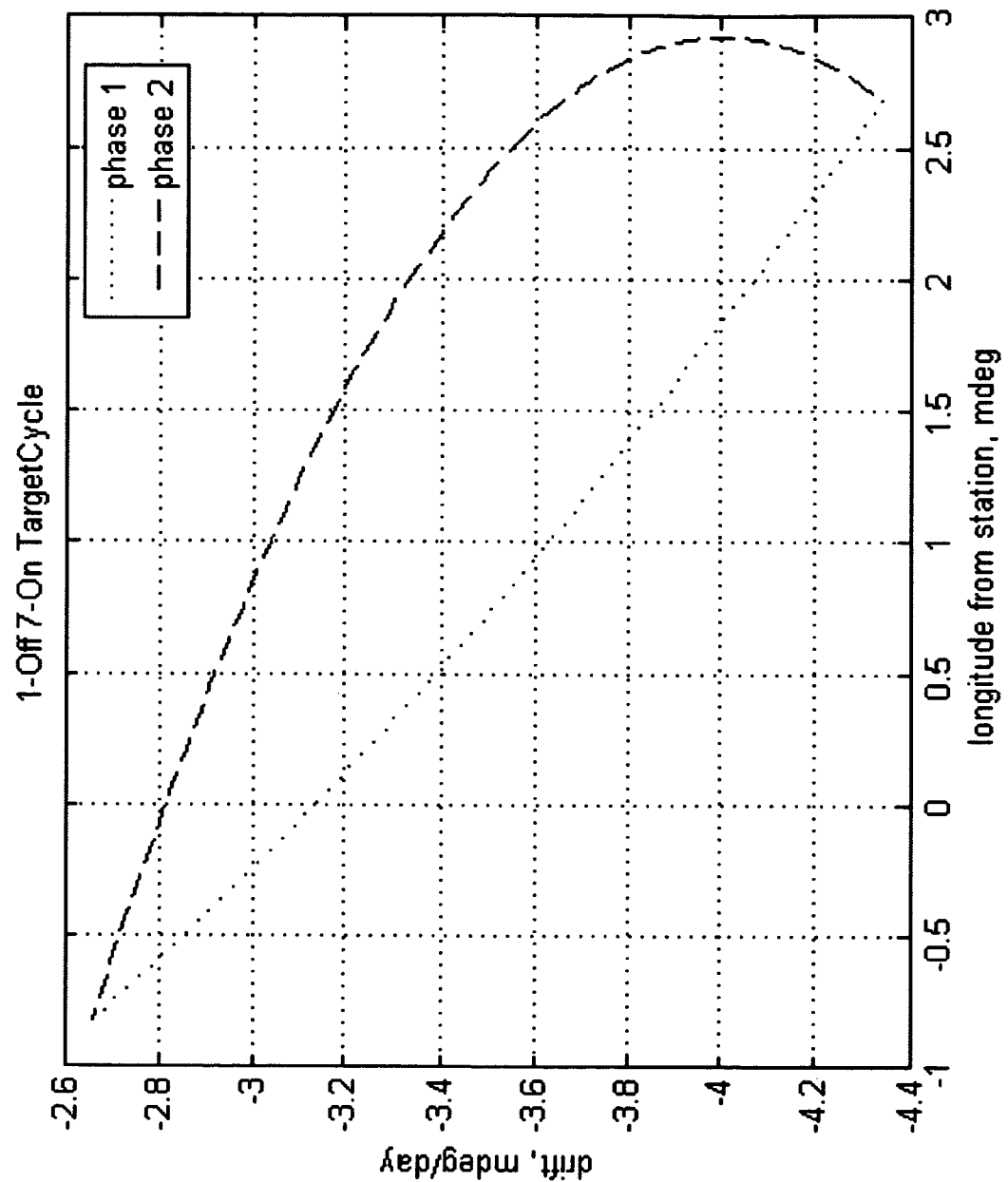
FIG. 1 shows a graph of a 1-on, 7-off target cycle, showing the target control locus, according to one embodiment of the invention.

The current invention provides longitude/drift control programs for tracking two-phase geosynchronous station keeping target cycles with low thrust, high specific impulse ion thrusters such as SPTs or XIPs. The aspects of the invention apply to the case of canted thrusters, which produce significant radial thrust with the along-track drift control thrust. In addition, the invention further includes the use of continuous and quasi-continuous control programs which track the target cycles.

For the same $\Delta V$, ion thrusters must be fired for a much longer duration than chemical thrusters. That duration may include several shorter firings, however, due either to electric power limitations or the desire to limit long-arc $\Delta V$ losses, or both. Thus, there may be one or more small-$\Delta V$ ion thruster firings each day over several days in order to exert station keeping longitude/drift control. The net effect of the quasi-continuous episodic delta drifts from each firing may be modeled as continuous longitude control acceleration. Conversely, the current invention provides an optimal continuous control program that is implemented by quasi-continuous impulsive delta drifts.

The current invention provides the design and implementation of longitude/drift control strategies targeting optimal two phase continuous acceleration target cycles using continuously or quasi-continuously firing thrusters which may also produce significant radial thrust. By ensuring that only along-track accelerations which counter triaxiality are applied, the controls achieve optimal $\Delta V$ performance in the presence of orbit determination, maneuver implementation, and orbit propagation modeling errors.

Let $l(t)=\lambda(t)-\Lambda$ denote the departure of mean geodetic longitude, $\lambda$, at time, $t$, of a geosynchronous vehicle from its mean geodetic station longitude, $\Lambda$, at which the triaxiality acceleration is a. Suppose a constant along-track control acceleration, $\alpha$, and an attendant mean longitude shift rate, $\delta$, are also applied. Then the longitude/drift phase plane kinematics are given by $$l(t) = L + (D+\delta)(t-s) + \left(\frac{a+\alpha}{2}\right)(t-s)^2,$$

$$d(t) = D + (a+\alpha)(t-s),$$

where switching point, (L, D), is the phase plane location at control thrust ignition or cutoff time, s. Non-thrusting coast is a special case control phase for which both $\alpha$ and $\delta$ are zero. During a thrusting phase, non-zero mean longitude shift rate, $\delta$, is a typical side effect of supplying the control acceleration, $\alpha$. For example, in order to mitigate plasma plume impingement on north and south face solar arrays, ion thrusters may be mounted on the anti-nadir face of a vehicle, canted so that their nominal thrust passes through the vehicle center of mass. The resultant nadir-directed component of thrust produces an easterly increment, $0<\delta$, in the mean longitude drift rate, dl/dt.

Since the time rate of l is $$\dot{l}(t)=(D+\delta)+(a+\alpha)(t-s)=d(t)+\delta,$$

l and d are kinematically coupled, $\dot{l}=d$, if and only if $\delta=0$. There are three reasons to decouple l and d in the presence of radial acceleration:

1. phase plane trajectories, $t \mapsto (l, d)$, are continuous curves across control switching points, s;
2. d remains proportional to semi-major axis whether a thruster is firing or not, where radial thrust produces an increment in the rate of mean geodetic longitude but no corresponding increment in mean motion; and
3. relative time, t−s, can be eliminated from l, d phase plane descriptions.

Indeed, as long as $a+\alpha \neq 0$, the following relation is provided $(t-s)=(d-D)/(a+\alpha)$ from which $$l(d) = L + \frac{(D+\delta)(d-D)}{a+\alpha} + \frac{(d-D)^2}{2(a+\alpha)},$$

with d rate of change $$l'(d) = \frac{d+\delta}{a+\alpha}.$$

The turn-around longitude extremum, M, is characterized by $l'(d)=0$, from which it follows that
$d=-\delta$ at turn-around, and that M is given by $$M = L - \frac{(D+\delta)^2}{2(a+\alpha)}$$

in terms of the control switching point (L, D) at t=s. The expression for l(d) is considerably
simplified if L and D are eliminated in favor of turn-around longitude, M, $$l(d; \alpha, \delta, M) = M + \frac{(d+\delta)^2}{2(a+\alpha)}.$$

Here d is the independent variable and $\alpha$, $\delta$, M are parameters which define the turn-around locus. Provided is $$l(-\delta; \alpha, \delta, M) = M,$$

$$l(D; \alpha, \delta, M) = L, \text{ and}$$

$$\frac{D+\delta}{a+\alpha} = T,$$

where T is the signed duration spent in the arc from $(M, -\delta)$ to (L, D).

A two-phase target locus is a closed curve in the (l, d) phase plane comprising two turn-around loci, with
- symmetric longitude turn-around extrema, $M_1=-M$, $M_2=+M$, bracketing longitude station at $l=\lambda-\Lambda=0$, using the convention that sign $(M)=$sign (a);
- control acceleration and longitude shift, $\alpha_k$, $\delta_k$, active through turn-around $M_k$, k=1, 2, respectively; and
- switching points $L_k$, $D_k$, k=1, 2, at which $\alpha$, $\delta$ switch from $\alpha_k$, $\delta_k$ to $\alpha_{3-k}$, $\delta_{3-k}$, respectively; and
- in-phase durations, $T_k=(D_k-D_{3-k})/(a+\alpha_k)$, k=1, 2.

By virtue of the sign convention for M, $M_1$ is the weak side turn-around (i.e., the side opposite the direction in which triaxiality acts), and $M_2$ is the strong side turn-around. The duration of one complete transit of a two phase locus is $T=T_1+T_2$. It is shown below that three parameters M, $T_1$, and $T_2$, subject to the geometric constraint that the two loci include a closed curve and to a fuel optimality constraint, completely define a fuel-optimal two-phase target locus.

Control phases 1 and 2 include a time-ordered closed drift cycle if $$0<=(D_1-D_2)/(a+\alpha_1)=T_1, \text{ and}$$

$$0<=(D_2-D_1)/(a+\alpha_2)=T_2.$$

Summing, it is seen that $$\alpha_1 T_1 + \alpha_2 T_2 = -aT,$$

where $T=T_1+T_2$ is the duration of one complete two-phase control cycle. Since $D_1$ and $D_2$ must be distinct—otherwise T=0 and there is no target cycle—it is seen that $$\text{sign}(a+\alpha_2)=-\text{sign}(a+\alpha_1),$$

so that the net triaxiality plus control accelerations in phases 1 and 2 are in opposition. The magnitude of the triaxiality drift perturbation is $\Delta D=|a|T$, and the magnitude of the control authority required to counter triaxiality in control phase k is $\Delta D_k=|\alpha_k|T_k$. Since $$|a|T<=|\alpha_1|T_1+|\alpha_2|T_2,$$

it is seen that net control authority [and therefore net fuel consumption] is minimized, $$\Delta D = \Delta D_1 + \Delta D_2,$$

if and only if $$\text{sign}(\alpha_1)=\text{sign}(\alpha_2)=-\text{sign}(a).$$

That is, a two-phase control program is fuel optimal if and only if neither the phase 1 nor the phase 2 control acceleration acts in the triaxiality direction.

Switching point drifts $D_1$ and $D_2$ must determine switching point longitudes $L_1$ and $L_2$ such that the two turn-around loci intersect at distinct control switching points, $(L_1, D_1)$ and $(L_2, D_2)$. That is, the quadratic equation $$l(D;\alpha_1,\delta_1,-M) - l(D;\alpha_2,\delta_2,+M) = 0$$

in D has two distinct real roots, $D_1$ and $D_2$. Expanding, we find that D solves $$(a_2-a_1)D^2 + 2(a_2\delta_1 - a_1\delta_2) + (a_2\delta_1^2 - a_1\delta_2^2 - 4a_1a_2M) = 0,$$

with roots $$D_{1,2} = \frac{-B \pm S}{A}, \text{ where}$$
$$S^2 = B^2 - AC,$$
$$A = a_2 - a_1,$$
$$B = a_2\delta_1 - a_1\delta_2,$$
$$C = a_2\delta_1^2 - a_1\delta_2^2 - 4a_1a_2M,$$
$$a_1 = a + \alpha_1, \text{ and}$$
$$a_2 = a + \alpha_2.$$

The roots are real and distinct if and only if $0 < S^2$. With a little manipulation, $S^2$ reduces to $$S^2 = a_1a_2[(\delta_1 - \delta_2)^2 + 4M(\alpha_2 - \alpha_1)],$$

and since
sign (a)=sign (M)=sign $(a+\alpha_1)$=−sign $(a+\alpha_2)$=−sign $(\alpha_1)$=−sign $(\alpha_2)$, it is seen that the closed curve constraint requires that $$4(\alpha_2 - \alpha_1)M < -(\delta_2 - \delta_1)^2.$$

The left hand side is non-positive by construction, so if $\delta_1 = \delta_2$, the constraint reduces to the obvious requirements that $$0 <= |\alpha_1| < |\alpha_2|, \text{ and}$$

$$0 \neq M.$$

Otherwise the constraint implies a floor on |M| for given $\alpha_1$ and $\alpha_2$. Moreover, if $D_1$, $D_2$ satisfy the closed curve constraint, then $$(D_2 - D_1)^2 = \frac{4S^2}{A^2} = -a_1a_2T_1T_2,$$

allowing one to reformulate the closed curve constraint in terms of $T_{1,2}$, which are more natural target locus design parameters.

Namely, the fuel optimality and closed curve constraints provide two equations relating the seven target cycle design parameters, M, $T_{1,2}$, $\alpha_{1,2}$, and $\delta_{1,2}$:

$$\alpha_1 T_1 + \alpha_2 T_2 + \alpha(T_1 + T_2) = 0,$$

$$T_1T_2(\alpha_2 - \alpha_1)^2 + 16M(\alpha_2 - \alpha_1) + 4(\delta_1 - \delta_2)^2 = 0.$$

Normally, it is the target cycle design attributes, M, $T_1$, $T_2$, $\delta_1$, $\delta_2$, which determine the control accelerations, $\alpha_1$, $\alpha_2$, through the nonlinear pair of equations above. Therefore it is convenient to solve the second equation for the control acceleration difference to obtain a linear system for $\alpha_{1,2}$, $$T_2\alpha_2 + T_1\alpha_1 = -a(T_2 + T_1),$$

$$\alpha_2 - \alpha_1 = \frac{-8M - \sqrt{(8M)^2 - 4T_1T_2(\delta_1 - \delta_2)^2}}{T_1T_2}.$$

However, any two of the seven parameters may be determined in terms of the remaining five, as illustrated by the first of the following examples.

Example: 8-Day Target Cycle with 1 No-Burn Day

Since $|a| < |\alpha_2|$, the no-burn day must include phase 1, and so $\alpha_1 = 0$, $\delta_1 = 0$, $T_1 = 1$, and $T_2 = 7$. Then with a=1.68 mdeg/day2, provided is $$\alpha_2 = -a\frac{T}{T_2} = -1.68\left(\frac{8}{7}\right) = -1.92 \text{ mdeg}/day^2.$$

Suppose the corresponding value of longitude shift is $\alpha_2 = 4$ mdeg/day. Then using $$M = -\frac{4(\delta_1 - \delta_2)^2 + T_1T_2(\alpha_2 - \alpha_1)^2}{16(\alpha_2 - \alpha_1)}.$$

it is revealed that M=2.9233 mdeg is the unique target cycle half-width which will support 1 no-burn day in 8 days. The control acceleration switching longitudes at $L_{1,2}$=−0.8175, +2.6825 mdeg, respectively, are asymmetrically placed relative to the station longitude at the origin. The target cycle does not include the western turn-around longitude for the no-burn coast phase. FIG. 1 shows a graph of a 1-on, 7-off target cycle, showing the target control locus. It is interesting to note that if there were no radial thrust one would have $\delta_2$=0, and the target cycle half-width would drop to M=0.8400 mdeg. Shown are the asymmetric offsets from the origin of the control switching longitudes, and the west turn-around longitude of the coast phase is beyond the target locus, so although the longitude half-width of the target cycle is 2.2933 mdeg, most of the target cycle duration is spent east of station and the range of longitudes traversed is only 3.7408 mdeg rather than the 5.8466 mdeg one might expect based on the half-width.

Example: 8-Day Symmetric Target Cycle with 0 No-Burn Days

Setting $T_1 = T_2 = 4$ it is seen that $\alpha_1 + \alpha_2 = -2a$. Fuel optimality restricts $\alpha_1$ to the domain $-a < \alpha_1 < 0$, and so for $\delta_1 = 4$ mdeg/day, and $\delta_2 = 5$ mdeg/day the range of feasible half-widths is $$M \in [1.9020, 3.4344] \text{ mdeg}.$$

Figure 2:
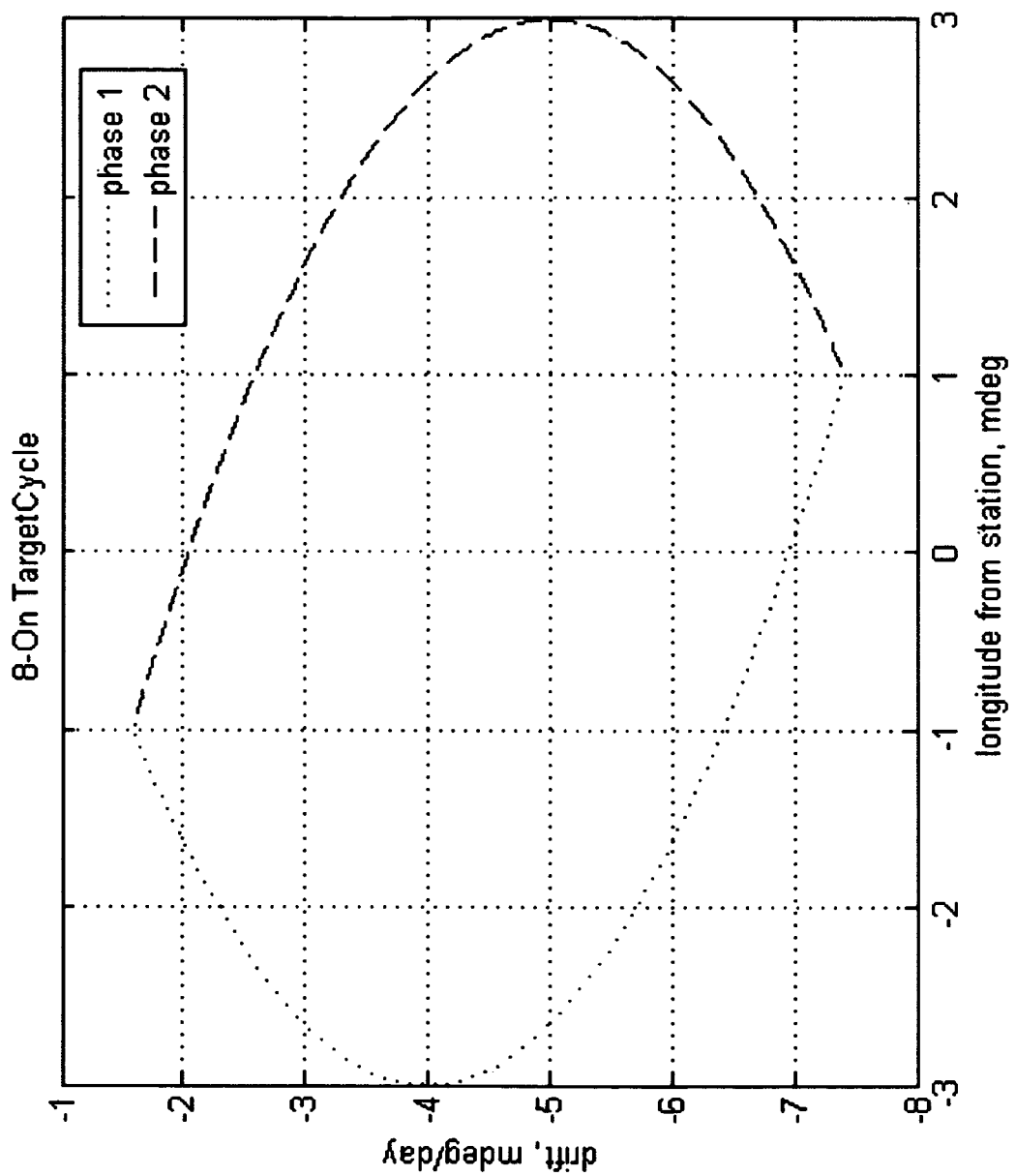
FIG. 2 shows a graph of an 8-On target control cycle, according to one embodiment of the invention.

Selecting M=3 mdeg, we find that $\alpha_{1,2}$=−0.2229, −3.1271 mdeg/day$^2$, with control acceleration switching longitudes at $L_{1,2}$=−1, +1 mdeg, respectively. FIG. 2 shows a graph of an 8-On target control cycle. As shown, the ±1 deg offsets in switching longitudes due to radial thrust are minimal in the symmetric case due to the similar values of the daily mean geodetic longitude shift in each phase. The times spent east and west of station are comparable.

Given an arbitrary phase plane position, L, D, the objective of continuous two-phase control is to acquire a desired two-phase target cycle and hold it over multiple two-phase cycle periods, T. The control should be closed loop for stability, and fuel optimal. Stability and acquisition are related. Holding the target cycle in the presence of propagation and modeling errors is conceptually identical to re-acquiring the target cycle after a small displacement such as a state correction after orbit determination. Acquisition of the target cycle from a large displacement would typically be required after a station relocation.

Figure 3:
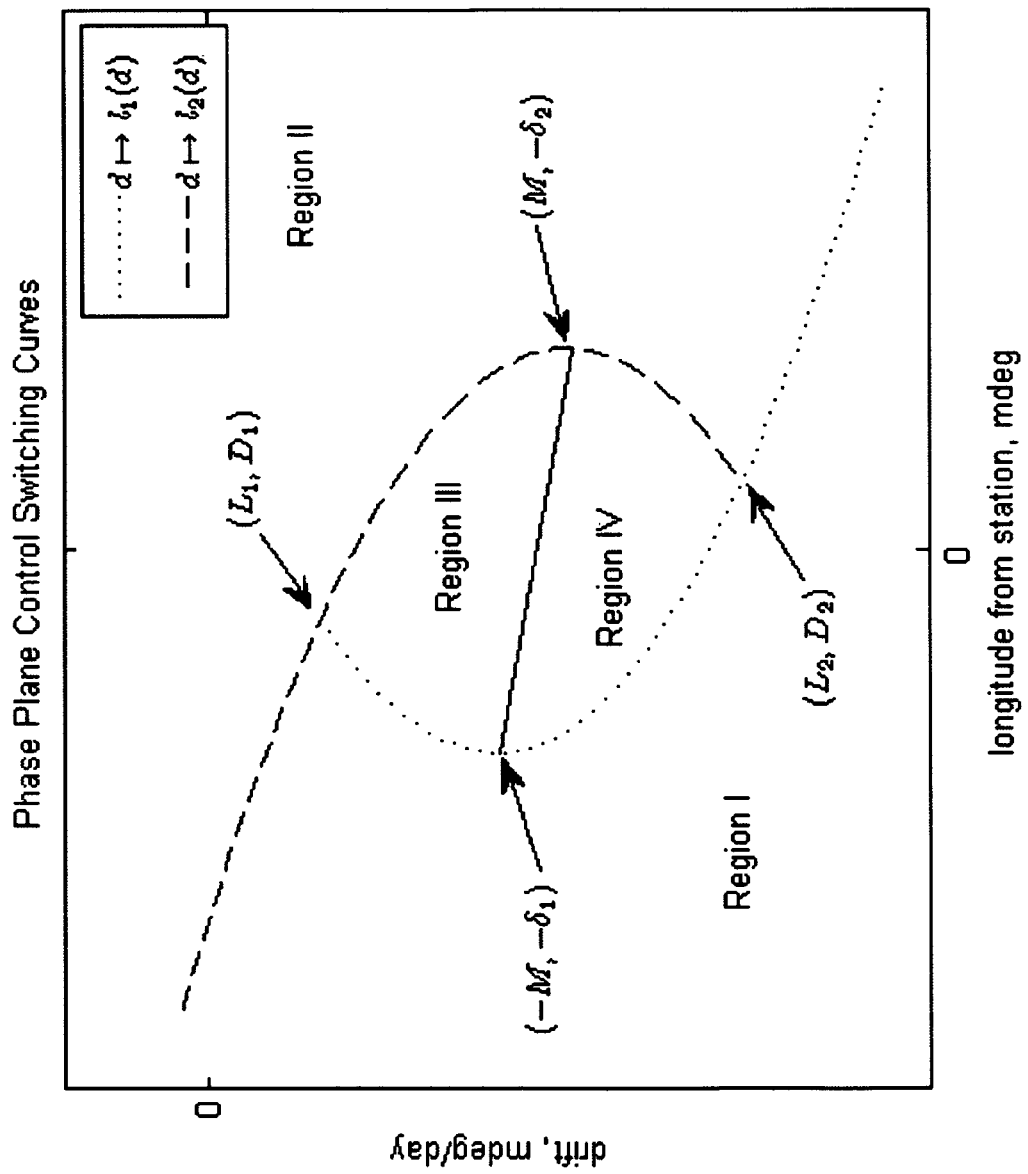
FIG. 3 shows a graph of phase plane switching curves, according to one embodiment of the invention.

A control program which converges to the target cycle from both small and large displacements is based on the phase plane control switching curves, $$l_k(d) = l(d; \alpha_k, \delta_k, (-1)^k M) = (-1)^k M + \frac{(d+\delta_k)^2}{2(a+\alpha_k)},$$

for k=1, 2 and d∈[−1,+1]. These curves are the extensions to the real line of the target cycle boundary curves defined for d∈[$D_1$, $D_2$]. FIG. 3 shows a graph of phase plane switching curves with control acceleration is $\alpha_1$ in Regions I and III, and $\alpha_2$ in Regions II and IV. As shown, for the case of easterly triaxiality, 0<a, the two switching curves divide the l, d plane into four regions:

$$\{D_2 < d, l < \min(l_1(d), l_2(d))\} \cup \{d < D_2, l < l_1(d)\}, \quad \text{I:}$$

$$\{d < D_1, \max(l_1(d), l_2(d)) < l\} \cup \{D_1 < d, l_2(d) < l\}, \quad \text{II:}$$

$$\{l_1(d) < l < l_2(d), d_z(l) < d\}, \quad \text{III:}$$

$$\{l_1(d) < l < l_2(d), d < d_z(l)\}, \quad \text{IV:}$$

where l ↦ $d_z$(l) is the line through the weak and strong turn-around points, $$d_z(l) = \frac{d_1(l-M) - d_2(l+M)}{2M}.$$

Given arbitrary L, D at time t=s, the control program is $$l(t) = L + (D+\delta)(t-s) + \left(\frac{a+\alpha}{2}\right)(t-s)^2,$$

$$d(t) = D + (a+\alpha)(t-s),$$

where the control acceleration, α, depends on the region in which (L, D) lies; namely, $$\alpha = \alpha_1, \quad \text{I:}$$

$$\alpha = \alpha_2, \quad \text{II:}$$

$$\alpha = \alpha_1, \quad \text{III:}$$

$$\alpha = \alpha_2. \quad \text{IV:}$$

By virtue of the construction of the control regions, a trajectory t ↦ (l, d) under control $\sigma_k$, k=1, 2, can cross only the switching curve $l_{3-k}$. At the crossing, t=σ, the control program is reset with s=σ, L=l(σ), D=d(σ), and α=$\alpha_{3-k}$. This control program design therefore precludes thrashing of the control when t ↦ l, d is congruent to a nearby switching curve, and it guarantees that t ↦ l, d will be coincident with a switching curve within at most one control switch.

Figure 4:
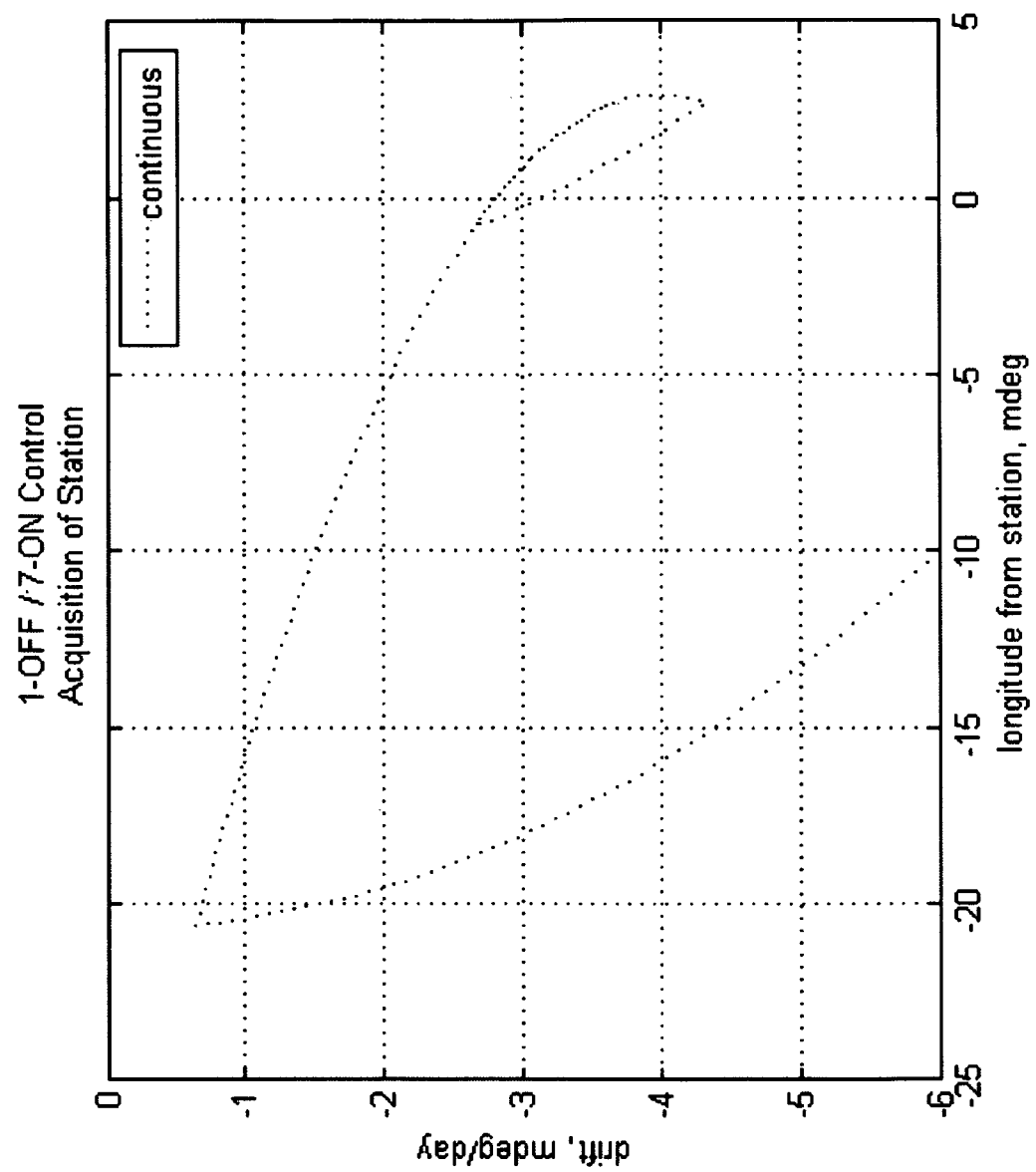
FIG. 4 shows a graph of 1-OFF/7-ON control, according to one embodiment of the invention.
Figure 5:
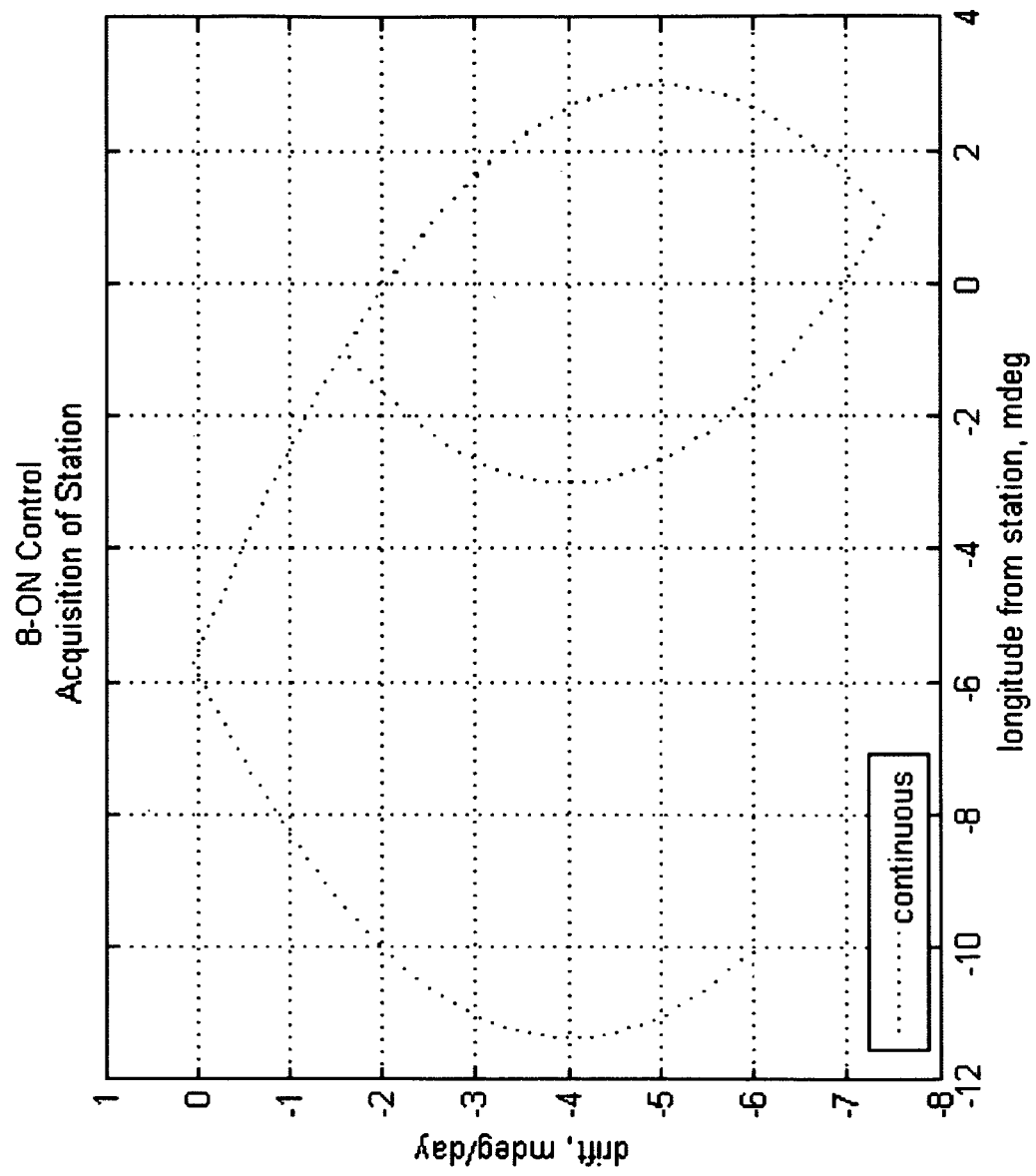
FIG. 5 shows a graph of 8-ON control, according to one embodiment of the invention.

FIGS. 4 and 5 show continuous control large displacement acquisition of the target cycles to for the 1-Off/7-On and 8-On examples discussed earlier. The advantage of applying non-zero control in both phases is apparent when the acquisition tracks are compared. The no-burn day example suffers from the negative drift bias required to accommodate radial effects of the burns in phase 2 but which is not balanced by radial mean geodetic longitude shift in phase 1. FIG. 4 shows a graph of 1-OFF/7-ON control acquisition. As shown, the initial (L, D) is in control program Region I, $\alpha_1$=0, so the first phase of the acquisition is a coast, nearly to the weak turn-around, followed by a drive back to the closed curve target cycle. The large westerly displacement is due to the biased SMA required for phase 2 but not countered by mean geodetic longitude shift in no-burn phase 1. FIG. 5 shows a graph of 8-ON control acquisition. As shown, the westerly excursion prior to acquiring the target cycle strong side switching curve is smaller than in the no-burn day case because there is easterly mean geodetic longitude shift in phase 1 as well as phase 2.

According to one embodiment of the invention, the objective of two-phase quasi-continuous control is to discretize a continuous two-phase control program by replacing continuous control acceleration, α, and continuous mean geodetic longitude shift, δ, with episodic (e.g., daily) impulsive Δd, and Δl. In this context, the role of the continuous control program is to provide an optimal l, d-continuous phase plane trajectory, which converges to and then maintains a desired target locus. The quasi-continuous control tracks this target trajectory with a piece-wise continuous sequence of l, d coasts punctuated by episodic Δl, Δd, which center the coast trajectory segments about the optimal continuous trajectory.

Suppose that the episodic quasi-continuous control is applied at discrete times, $\tau_k$, k=1, ..., n. Focusing on one such discrete time, drop the subscript k for clarity, and let s and S be the mid-points of the coast phases preceding and following τ, respectively. The closed loop discrete delta drift at τ is given by $$\Delta D(\tau) = \gamma(\tau)[d(S) - D(s) + a(v - u)],$$

where t ↦ l is the optimal continuous target drift, t ↦ D is the actual drift at time t, a is triaxiality, u=τ−s, v=τ−S, and γ(τ) is a non-dimensional drift tuning gain, the nominal value of which is γ=1. The corresponding closed loop discrete delta-longitude is $$\Delta L(\tau) = \kappa(\tau)\left[l(S) - L(s) + d(S)v - D(s)u + \frac{a(v^2 - u^2)}{2}\right],$$

where t ↦ l is the optimal continuous control program longitude, t ↦ L is the actual longitude at time t, and κ(τ) is a non-dimensional longitude tuning gain. In most applications ΔL(τ) is not commandable in that the shift in mean geodetic longitude at each impulse is a fixed side effect of producing ΔD(τ). In such cases we use the open loop predicted delta longitude, $$\Delta L(\tau) = \kappa(\tau) \int_s^S \delta(t) dt,$$

where δ(t)=$\delta_{1,2}$ is determined by the control region in which the controlled phase plane trajectory, t ↦ (L, D) lies. The open loop ΔL is the best estimated discrete phase shift given the mean geodetic longitude shifts, $\delta_{1,2}$, associated with the control accelerations, $\alpha_{1,2}$. Note that δ(t) is at worst piecewise constant over interval [s, S], and so the integral may be evaluated exactly. The term hybrid control is used here to mean closed loop ΔD combined with open loop ΔL. The performance of hybrid controls is demonstrated in the examples which follow.

Examples of Hybrid Control

Figure 12:
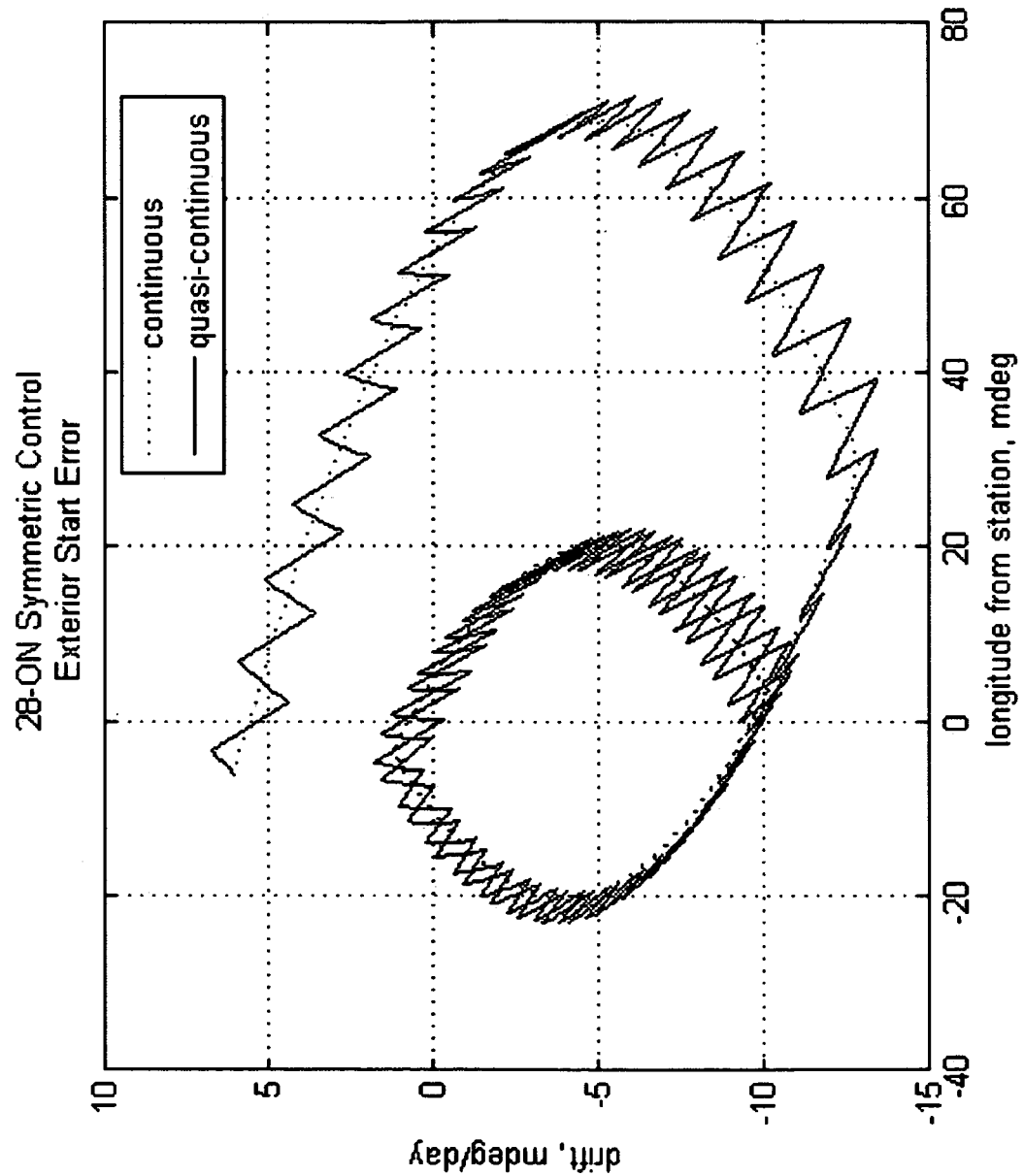
FIGS. 12-13 show alternative quasi-continuous implementations of a 28 day symmetric target locus, according to further embodiments of the current invention.
Figure 13:
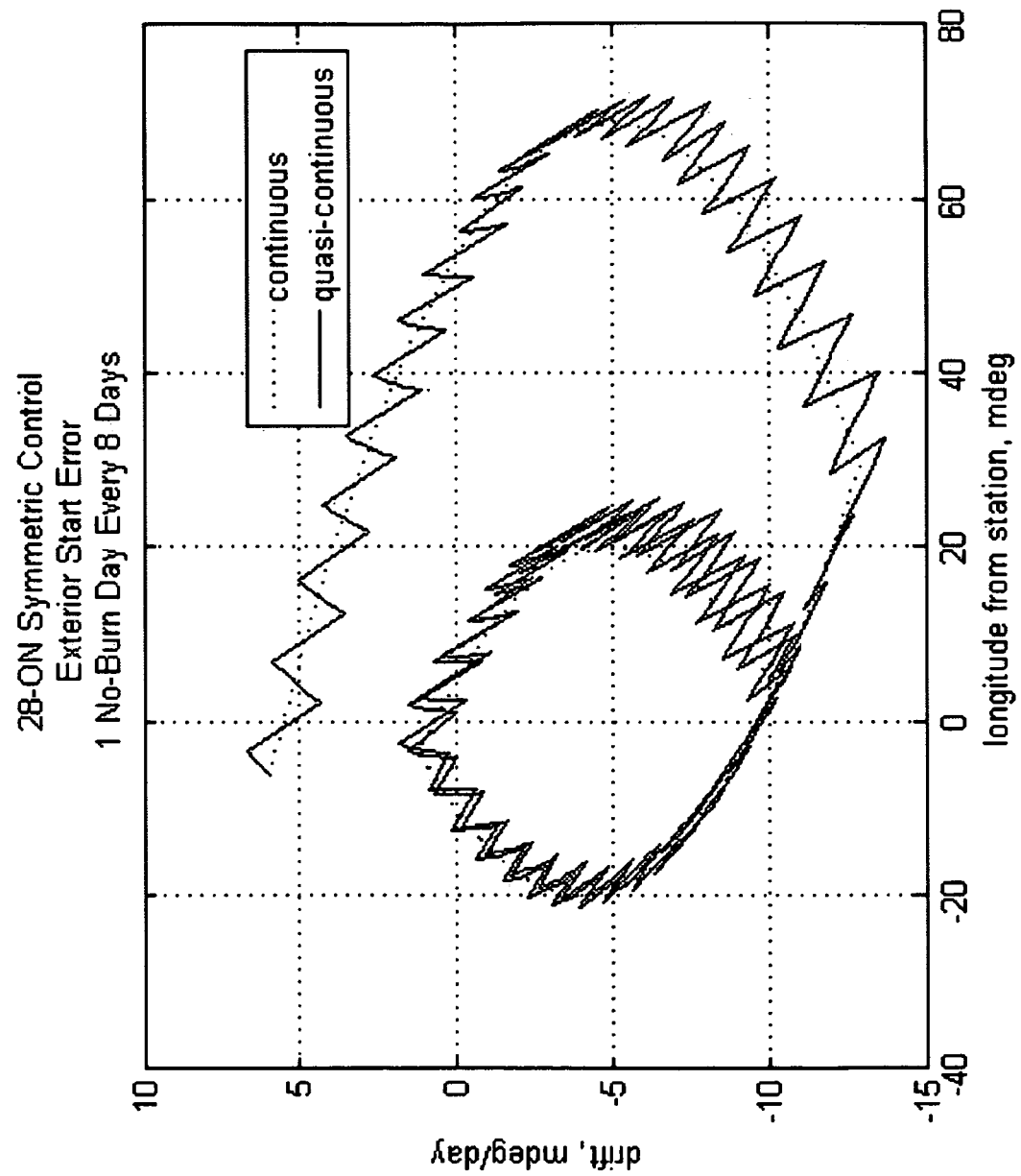
Figure 14:
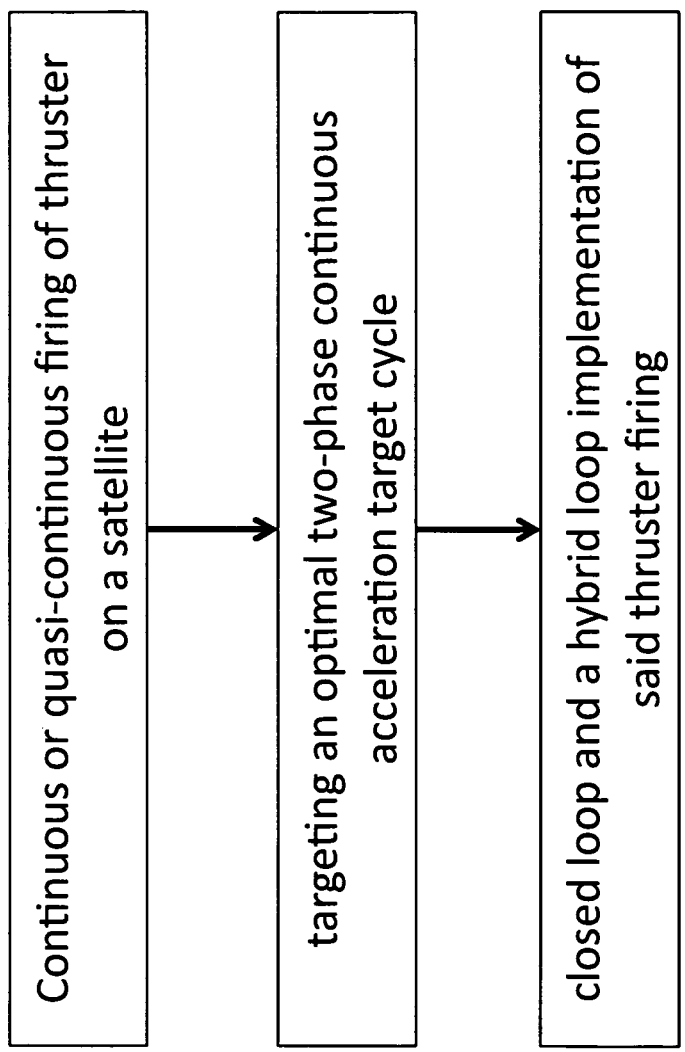
FIG. 14 shows a flow diagram of the method according to one embodiment of the current invention.

FIG. 6-FIG. 11 present six quasi-continuous control scenarios based on the two 8-day target loci examples discussed above. For each of the two examples, daily (ΔL, ΔD) impulses provide 1. large displacement quasi-continuous station acquisition;
2. small displacement quasi-continuous station re-acquisition from outside the target locus; and
3. small displacement quasi-continuous station re-acquisition from inside the target locus;

The discussion for each figure draws attention to distinguishing features of the scenario. A final pair of scenarios, FIGS. 12 and 13, show alternative quasi-continuous implementations of a 28 day symmetric target locus. In the first implementation, there is a non-zero (ΔL, ΔD) impulse daily. In the second implementation, the ΔL, ΔD impulse on every eighth day is suppressed by setting γ=κ=0; and γ=κ=8/7 otherwise. The second implementation shows that quasi-continuous discrete controls with occasional no-burn days can track symmetric continuous control programs successfully.

Figure 6:
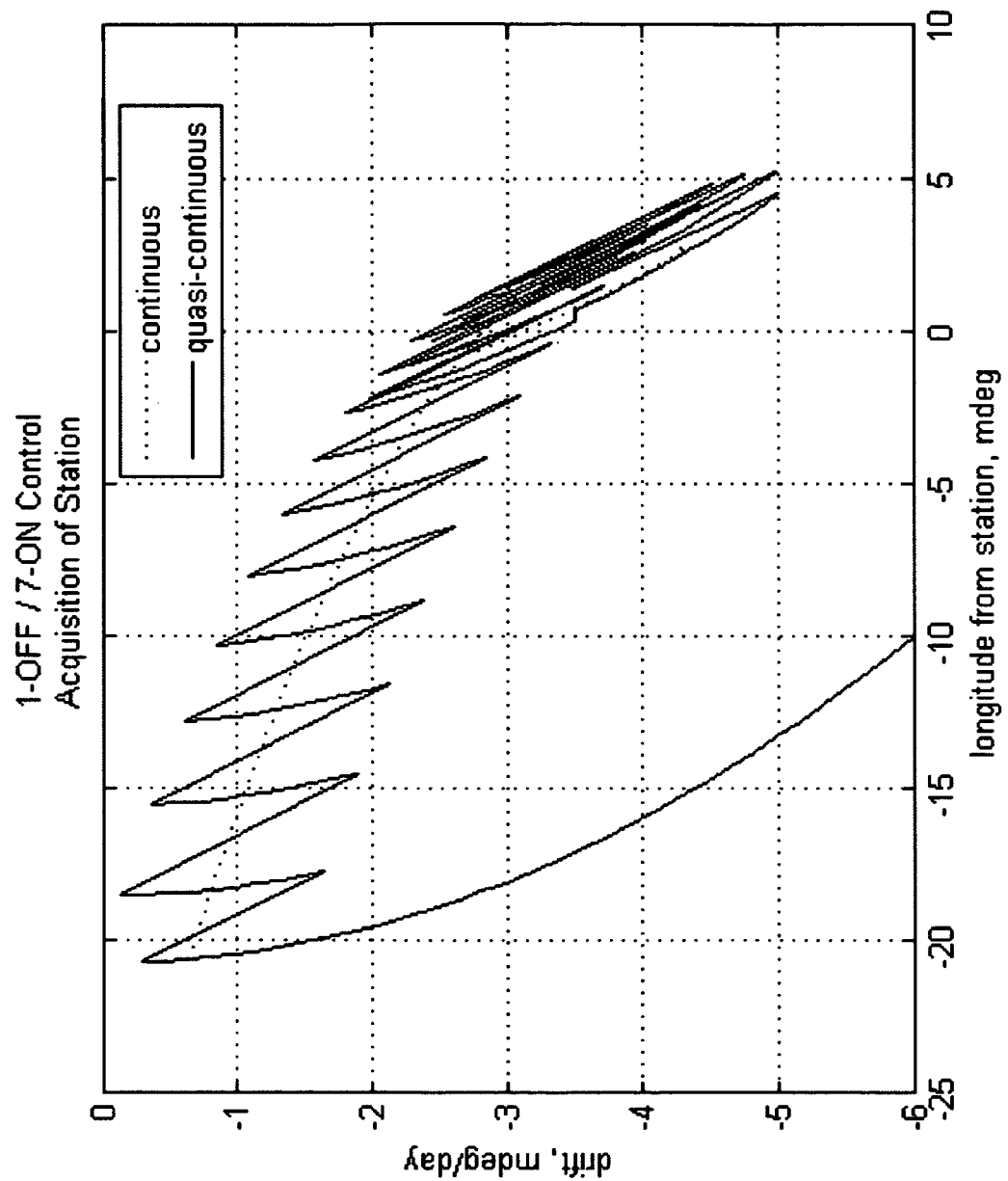
FIGS. 6-11 show six quasi-continuous control scenarios based on the two 8-day target loci examples, according to one embodiment of the current invention.

In FIG. 6, following a long coast along a no-burn arc, the quasicontinuous daily maneuvers drop into the target locus on the strong side. The daily ΔD is commensurate with the drift-size of the target locus, but holds the locus over two target cycles.

Figure 7:
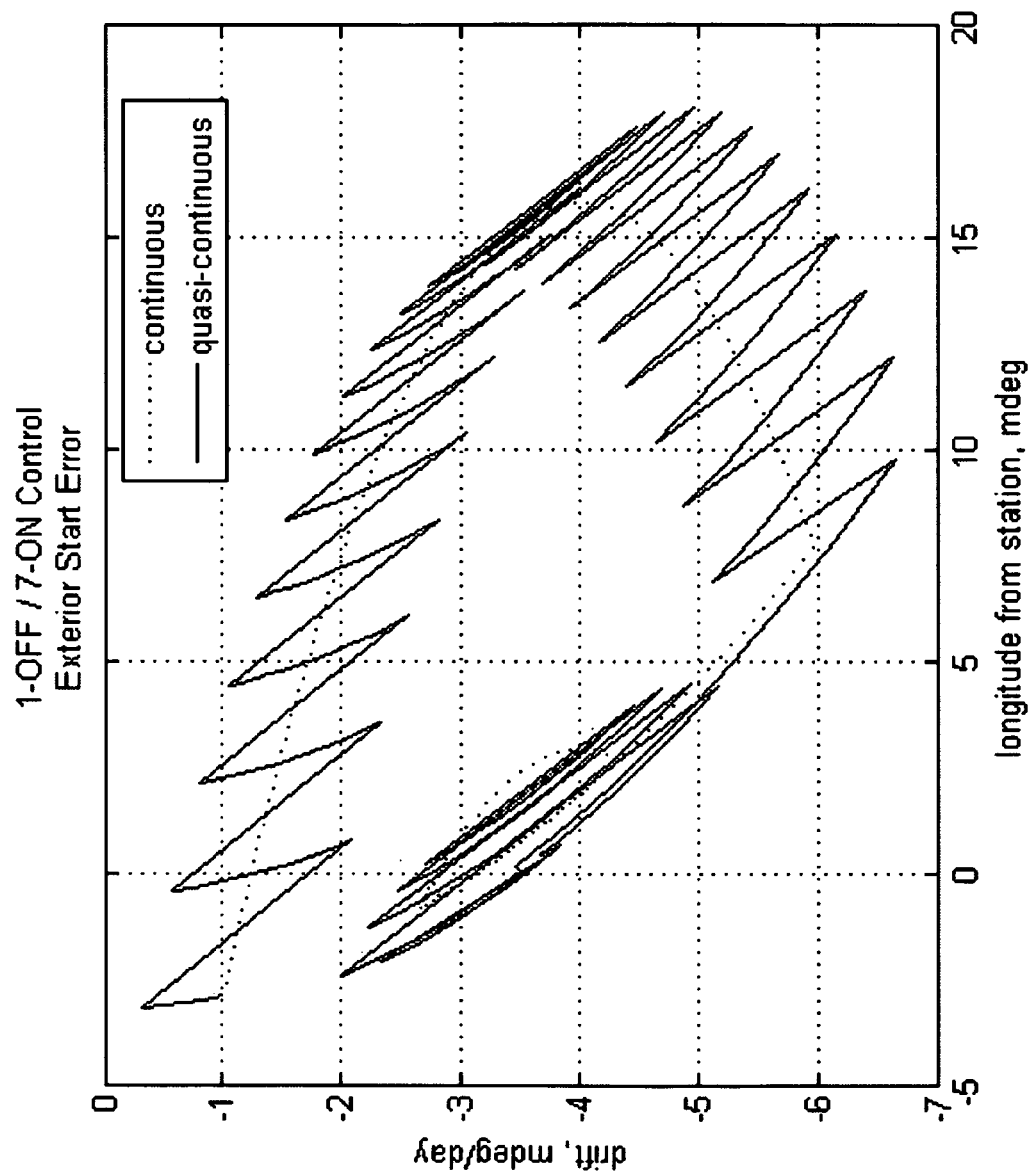

Regarding FIG. 7, in this small displacement acquisition, the control acquires the cycle on the weak (noburn) side. Clearly, the daily ΔD is not constant on the strong side arc. The variation is essential to hold the station longitude given the small box half-width.

Figure 8:
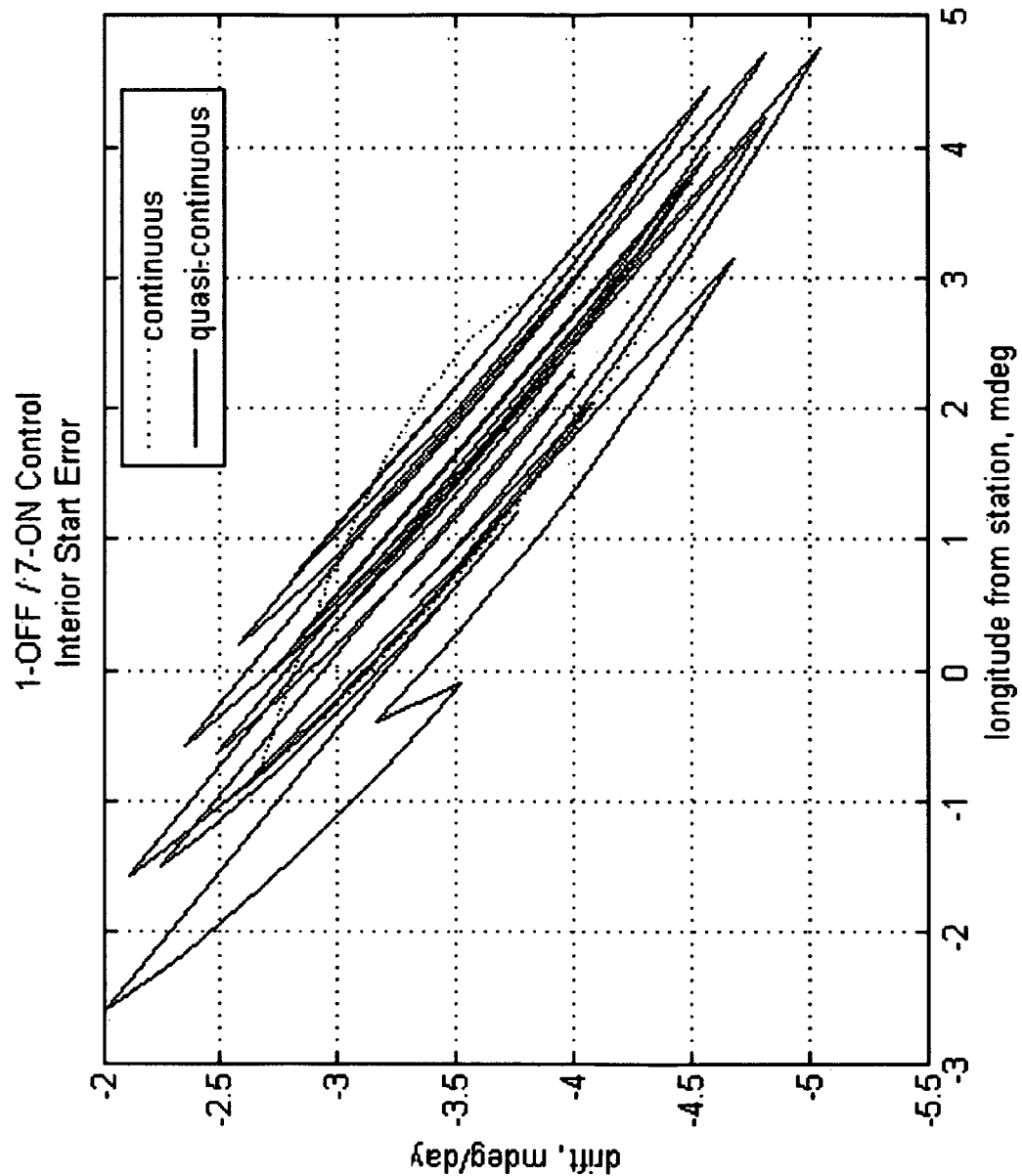

In FIG. 8, an interior small displacement start error converges rapidly to the target locus.

Figure 9:
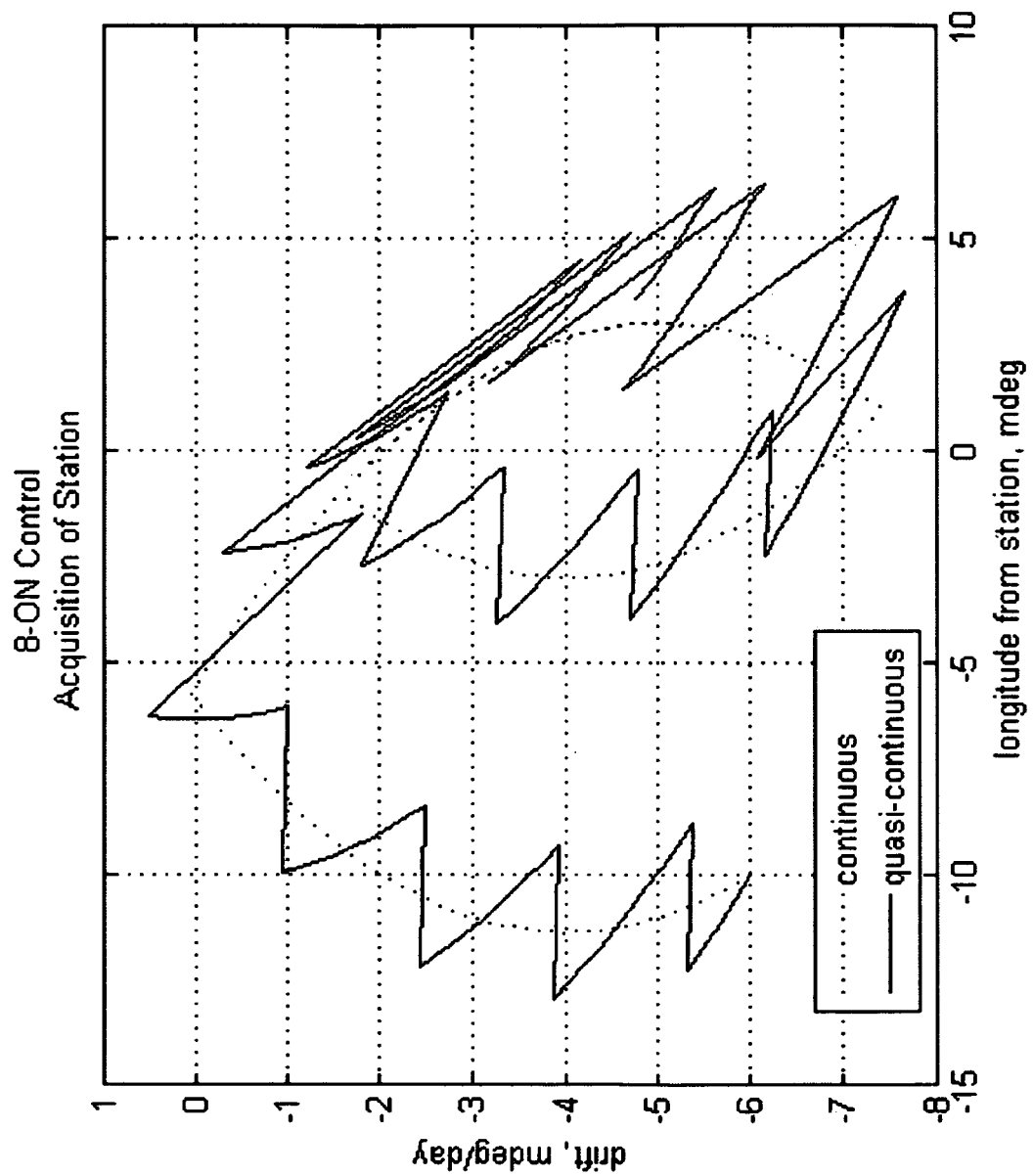

FIG. 9 shows acquisition of station from the west using daily control is aided by the daily easterly mean geodetic longitude drift. Compare this scenario to the no-burn acquisiton in FIG. 6, in which 10 mdeg of westerly no-burn coast are required to acquire the powered strong-side arc.

Figure 10:
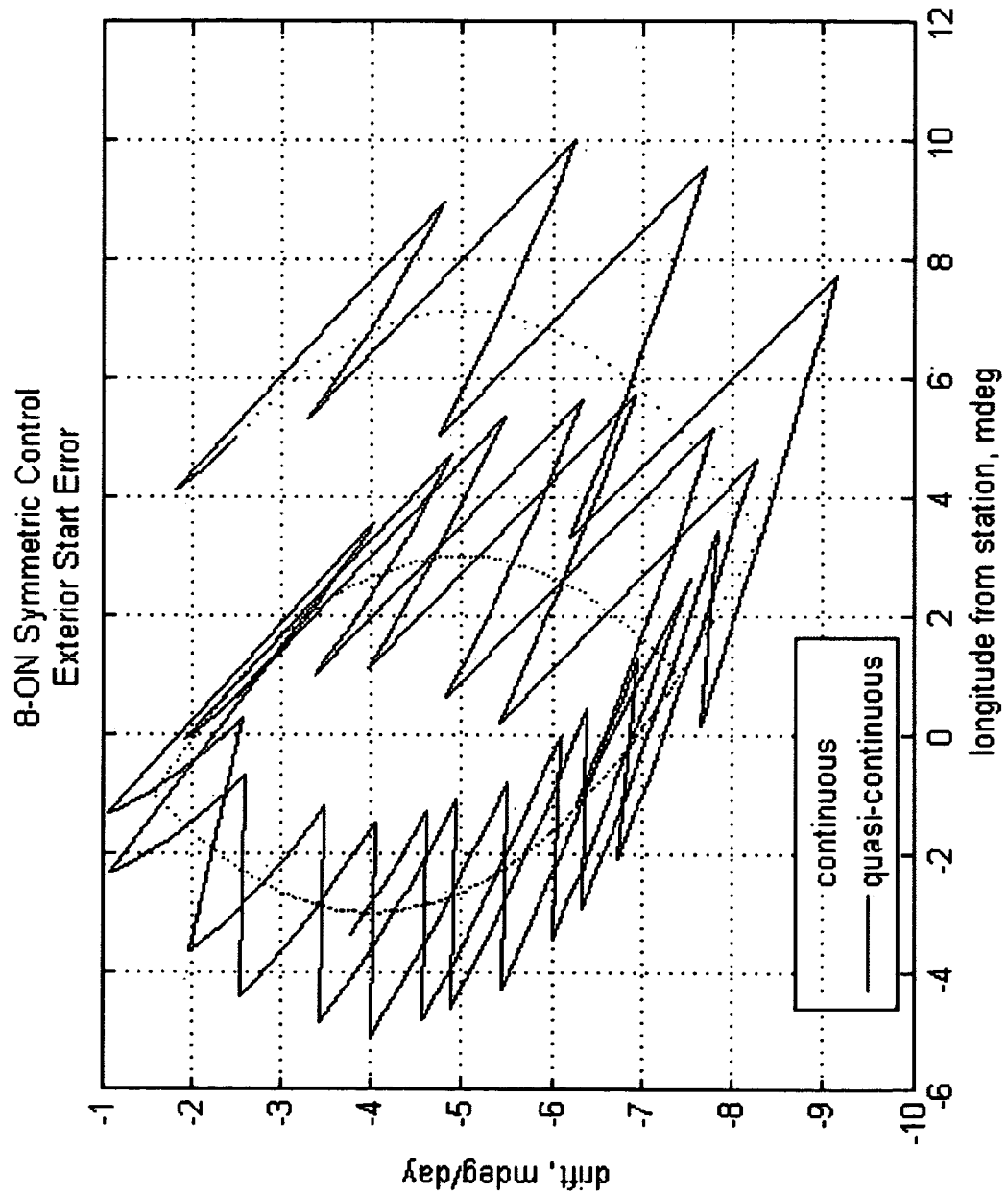

Regarding FIG. 10, a small displacement to the north and east of the symmetric target locus acquires the weak side switching curve and locks onto the target locus for two more cycles.

Figure 11:
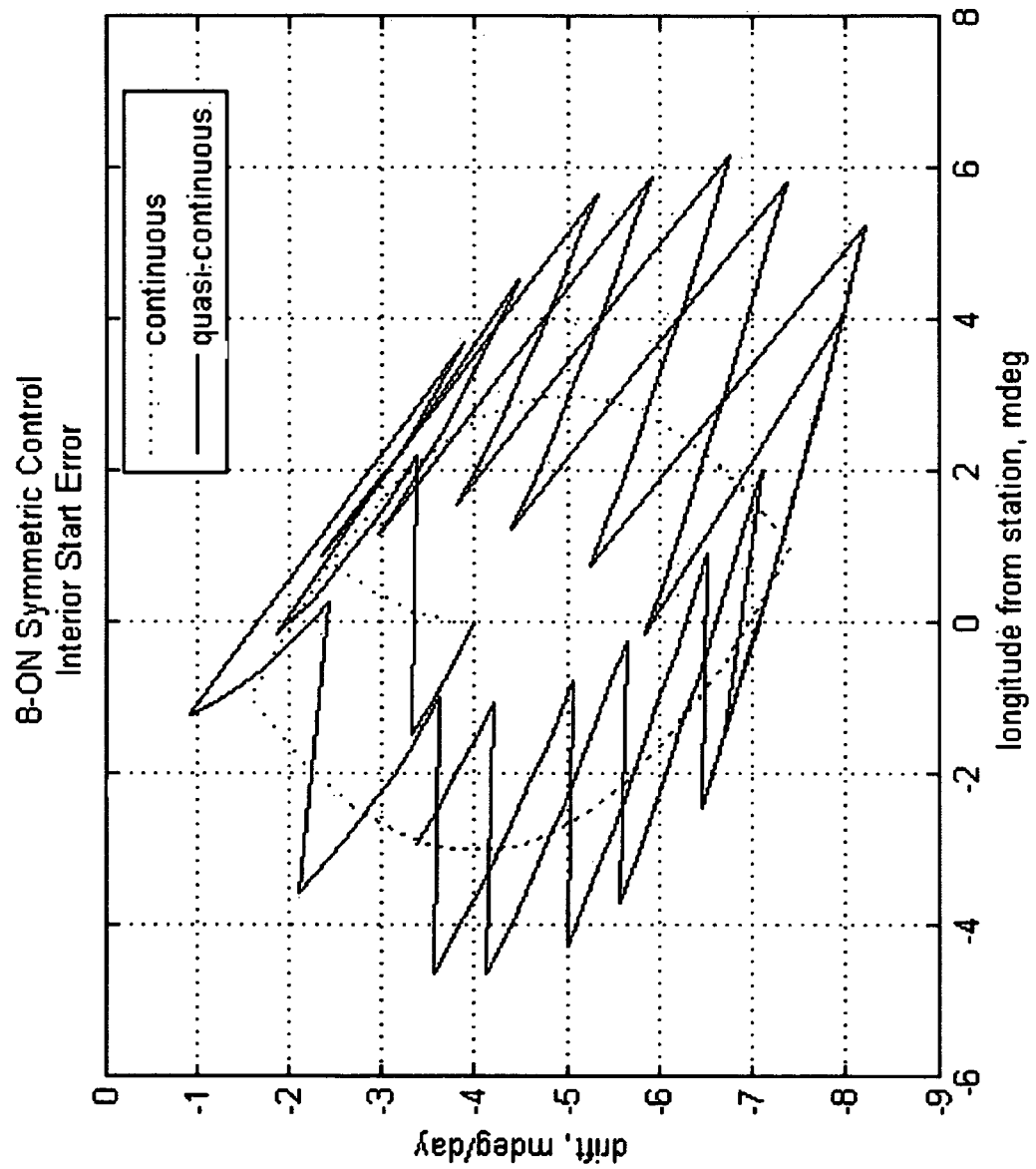

Shown in FIG. 11, an interior start error is corrected with the first maneuver. Notice that ΔD≈0, nearly all of the correction being supplied by the mean geodetic longitude shift to the east. This is another illustration that the quasi-continuous deltas are not constant over a cycle.

In FIG. 12, this 28 day target locus is included to illustrate the benefits of operating ion thrusters on chemical thruster-scale drift cycles. Daily orbital deltas are much smaller than the scale of the target locus, so on-the-fly corrections of propagation and maneuver modeling errors do not cause significant departures from the target locus. No-burn days are not necessary.

Regarding FIG. 13, this 28 day scenario is identical to that in FIG. 12, except that maneuvers are suppressed on every eighth day. This is effectively a 1-OFF/7-ON quasi-continuous implementation of a 28-ON continuous control.

Once a quasi-continuous control has acquired the target cycle, its efficiency relative to the optimal continuous control can be assessed by comparing the net control authority expended, ΔDα, to the net triaxiality pertubation experienced, ΔDa, $$\Delta D_\alpha = \sum_j |\Delta D(\tau_j)|,$$

$$\Delta D_a = |a|S,$$

$$f = \frac{\Delta D_a}{\Delta D_\alpha}$$

where S is the post-acquisition control duration, and f is the quasi-continuous control efficiency. Table 1 tabulates the post-acquisition efficiency for four complete control cycles using each of the three control strategies from the examples above. In each case the quasi-continuous control uses slightly less control authority than the optimal continuous control it tracks. Of course the discrete control cannot track the continuous control exactly, making its advantage by cutting the corners at control switch points and turn-around longitudes.

TABLE 1

Each quasi-continuous control uses slightly less control authority than the optimal continuous control it tracks.
Quasi-Continuous Control Efficiency

| Scenario | S days | ΔD$_\alpha$ mdeg/day | ΔD$_a$ mdeg/day | f ones |
|---|---|---|---|---|
| 1-OFF/7-ON | 32 | 53.3770 | 53.7600 | 1.0072 |
| 8-ON | 32 | 51.5078 | 53.7600 | 1.0437 |
| 28-ON | 112 | 186.9266 | 188.1600 | 1.0066 |

The current invention provides the design and implementation of longitude/drift control strategies targeting optimal two-phase continuous acceleration target cycles using continuously or quasi-continuously firing thrusters which may also produce significant radial thrust. By ensuring that only accelerations which counter triaxiality are applied, the controls presented achieve optimal ΔV performance in the presence of orbit determination and orbit propagation errors. Closed loop and hybrid open/closed loop quasi-continuous implementations of the optimal continuous control programs are developed and demonstrated on several example scenarios.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the control applications may be episodic with arbitrary or irregular period. The reference trajectory may be corrected or re-defined during any cycle based on the results of routine orbit determination or following orbit adjustments for purposes other than stationkeeping.

All such variations are considered to be within the scope and spirit of the present invention as defined by the following claims and their legal equivalents.

What is claimed:
1. A satellite longitude and drift control method comprising:
   a. using a continuously or a quasi-continuously firing thruster on a satellite, wherein said thruster is disposed to apply accelerations which counter a tri-axiality displacement in an orbit of said satellite, wherein said satellite thruster is disposed to achieve optimal ΔV performance in the presence of orbit determination and orbit propagation errors; and
   b. targeting an optimal two-phase continuous acceleration target cycle using said continuously or said quasi-continuously firing thruster;
   c. using a closed loop and a hybrid loop implementation of said thruster firing, wherein said hybrid loop implementation comprises an open and closed loop implementation, wherein said closed loop and said hybrid loop implementations are disposed to provide quasi-continuous implementations of an optimal continuous control program.

2. The method of claim 1, wherein said thruster comprises, a stationary plasma thruster (SPT), or a xenon ion propulsion system (XIP).

3. The method of claim 1, wherein said thruster is disposed on said satellite to mitigate thruster plume impingement on north and south face solar arrays wherein said thruster is disposed on an anti-nadir face of said satellite, wherein said thruster is canted to provide a nominal thrust that passed through a center of mass of said satellite.

4. The method of claim 1, wherein said thruster is disposed to provide radial thrust.

5. The method of claim 1, wherein target cycles comprises at least one no-firing day for said thruster.

6. The method of claim 1, wherein said targeted two-phase continuous acceleration cycle is discretized, wherein a continuous acceleration of said thruster is replaced with a change in an episodic impulsive mean longitudinal drift, wherein a mean geodetic longitudinal drift is replaced with a change in a mean longitudinal departure, wherein said continuous control program is disposed to provide an optimal said episodic impulsive mean longitudinal departure, wherein a mean longitudinal drift-continuous phase plane trajectory converges to a desired locus, whereby said locus is maintained.

7. The method of claim 6, wherein said quasi-continuous control tracks a target trajectory using a piece-wise continuous sequence of said episodic mean longitudinal departures, wherein said mean geodetic longitudinal drift is acted on by said episodic mean longitudinal departure, wherein said mean geodetic longitudinal drift is acted on by an episodic geodetic longitudinal drift, wherein a coast trajectory segment is centered about an optimal continuous trajectory.

\* \* \* \* \*